(12) United States Patent
Vyas et al.

(10) Patent No.: US 10,666,443 B2
(45) Date of Patent: May 26, 2020

(54) CONTINUED VERIFICATION AND MONITORING OF APPLICATION CODE IN CONTAINERIZED EXECUTION ENVIRONMENT

(71) Applicant: Red Hat, Inc., Raleigh, NC (US)

(72) Inventors: Jay Vyas, West Concord, MA (US); Suneel Marthi, Ashburn, VA (US)

(73) Assignee: Red Hat, Inc., Raleigh, NC (US)

( * ) Notice: Subject to any disclaimer, the term of this patent is extended or adjusted under 35 U.S.C. 154(b) by 147 days.

(21) Appl. No.: 15/296,288

(22) Filed: Oct. 18, 2016

(65) Prior Publication Data
US 2018/0109387 A1     Apr. 19, 2018

(51) Int. Cl.
| | |
|---|---|
| *H04L 29/06* | (2006.01) |
| *H04L 9/32* | (2006.01) |
| *G06F 8/60* | (2018.01) |
| *G06F 8/71* | (2018.01) |
| *G06F 21/53* | (2013.01) |
| *G06F 21/51* | (2013.01) |
| *G06F 9/455* | (2018.01) |

(52) U.S. Cl.
CPC .............. *H04L 9/3247* (2013.01); *G06F 8/60* (2013.01); *G06F 8/71* (2013.01); *G06F 21/53* (2013.01); *G06F 9/455* (2013.01); *G06F 21/51* (2013.01)

(58) Field of Classification Search
CPC ....... H04L 9/3247; H04L 9/0643; G06F 8/60; G06F 21/51; G06F 2221/033
See application file for complete search history.

(56) References Cited

U.S. PATENT DOCUMENTS

| | | | | |
|---|---|---|---|---|
| 6,813,358 | B1 * | 11/2004 | Di Crescenzo | H04L 63/0428 380/277 |
| 7,047,241 | B1 * | 5/2006 | Erickson | G06F 21/10 |
| 7,082,615 | B1 * | 7/2006 | Ellison | G06F 9/468 380/44 |
| 7,353,541 | B1 * | 4/2008 | Ishibashi | G06F 21/10 348/E7.056 |
| 7,568,114 | B1 * | 7/2009 | Schlafly | G06Q 20/382 705/64 |

(Continued)

FOREIGN PATENT DOCUMENTS

| | | |
|---|---|---|
| CN | 105069353 A | 11/2015 |
| CN | 105491039 A | 4/2016 |
| WO | 2016099346 A1 | 6/2016 |

OTHER PUBLICATIONS

Andrew Phillips, "8 Questions You Need to Ask About Microservices, Containers & Docker in 2015", XebiaLabs Blog (http://blog.xebialabs.com), Dec. 31, 2014, 4 pages.

(Continued)

*Primary Examiner* — David Garcia Cervetti
(74) *Attorney, Agent, or Firm* — Lowenstein Sandler LLP

(57) ABSTRACT

A method includes receiving, by a processing device executing a validation service, a validation data associated with a first instance of an execution environment, the validation data provided by a publication service associated with a second instance of the execution environment, acquiring a decryption key from a release server associated with the execution environment, determining, using the decryption key, a validation status associated with the first instance in view of the validation data, and notifying the release server of the validation status.

20 Claims, 5 Drawing Sheets

(56) References Cited

U.S. PATENT DOCUMENTS

| | | | | |
|---|---|---|---|---|
| 7,627,768 B2* | 12/2009 | Finkelstein | G06F 21/50 | 380/28 |
| 7,730,297 B1* | 6/2010 | Pravetz | H04L 63/061 | 713/152 |
| 7,739,663 B2* | 6/2010 | Newcomb, Jr. | H04L 41/0869 | 714/38.14 |
| 7,984,304 B1* | 7/2011 | Waldspurger | G06F 21/565 | 713/187 |
| 8,087,092 B2* | 12/2011 | Richardson | G06F 21/86 | 713/187 |
| 8,108,856 B2* | 1/2012 | Sahita | G06F 9/45533 | 718/1 |
| 8,285,999 B1* | 10/2012 | Ghose | G06F 21/54 | 713/170 |
| 8,327,441 B2* | 12/2012 | Kumar | G06F 21/31 | 726/22 |
| 8,438,298 B2* | 5/2013 | Arai | G06F 8/65 | 709/203 |
| 8,464,207 B2 | 6/2013 | Pouliot | | |
| 8,499,151 B2* | 7/2013 | Durham | G06F 21/54 | 380/255 |
| 8,601,583 B1* | 12/2013 | Chandrasekhar | G06F 21/54 | 726/24 |
| 8,700,532 B2* | 4/2014 | Nakae | G06F 21/53 | 705/51 |
| 8,707,050 B1* | 4/2014 | Robinson | G06F 21/51 | 713/187 |
| 8,819,225 B2* | 8/2014 | Wang | G06F 21/575 | 709/224 |
| 8,826,013 B1* | 9/2014 | Kodukula | G06F 21/53 | 380/279 |
| 8,831,995 B2* | 9/2014 | Holler | G06F 8/65 | 705/51 |
| 8,938,611 B1* | 1/2015 | Zhu | H04L 49/70 | 713/153 |
| 9,003,372 B2* | 4/2015 | Stella | H04L 63/0428 | 717/126 |
| 9,069,782 B2* | 6/2015 | Yang | G06F 21/53 | |
| 9,270,663 B2* | 2/2016 | Kravitz | H04L 9/006 | |
| 9,397,910 B2 | 6/2016 | Miryanov et al. | | |
| 9,400,741 B1* | 7/2016 | Bono | G06F 12/023 | |
| 9,442,752 B1* | 9/2016 | Roth | G06F 9/45558 | |
| 9,461,819 B2* | 10/2016 | Nakae | G06F 21/53 | |
| 9,575,793 B1* | 2/2017 | Allen | G06F 21/53 | |
| 9,577,829 B1* | 2/2017 | Roth | G06F 21/60 | |
| 9,686,278 B1* | 6/2017 | Rodgers | H04L 63/0281 | |
| 9,686,356 B2* | 6/2017 | Raduchel | H04L 67/1095 | |
| 9,697,371 B1* | 7/2017 | Willden | G06F 21/62 | |
| 9,703,965 B1* | 7/2017 | Robinson | G06F 21/602 | |
| 9,760,395 B2* | 9/2017 | Doherty | G06F 11/30 | |
| 9,760,428 B1* | 9/2017 | Felstaine | H04L 41/022 | |
| 9,767,271 B2* | 9/2017 | Ghose | G06F 9/3851 | |
| 9,767,284 B2* | 9/2017 | Ghose | G06F 9/3877 | |
| 9,838,361 B2* | 12/2017 | Birger | H04L 63/045 | |
| 9,842,117 B1* | 12/2017 | Zhou | G06F 16/128 | |
| 9,846,899 B1* | 12/2017 | Stickle | G06Q 30/06 | |
| 9,847,990 B1* | 12/2017 | de Boursetty | H04L 9/3213 | |
| 9,892,265 B1* | 2/2018 | Tripathy | G06F 21/602 | |
| 9,948,616 B2* | 4/2018 | Jung | G06F 9/45558 | |
| 10,044,695 B1* | 8/2018 | Cahill | H04L 63/08 | |
| 10,248,345 B1* | 4/2019 | Dickson | G06F 3/0622 | |
| 10,338,969 B2* | 7/2019 | Wilkinson | H04L 67/16 | |
| 10,389,686 B2* | 8/2019 | Glazemakers | H04L 63/0272 | |
| 10,396,991 B2* | 8/2019 | Arasu | H04L 9/3234 | |
| 10,397,255 B1* | 8/2019 | Bhalotra | H04L 63/1433 | |
| 2002/0010910 A1* | 1/2002 | Crudele | G06F 8/61 | 717/128 |
| 2002/0027992 A1* | 3/2002 | Matsuyama | G06F 21/10 | 380/231 |
| 2002/0198895 A1* | 12/2002 | Arnold | G06F 9/4411 | |
| 2003/0074552 A1* | 4/2003 | Olkin | H04L 51/30 | 713/150 |
| 2004/0107416 A1* | 6/2004 | Buban | G06F 8/658 | 717/170 |
| 2004/0123109 A1* | 6/2004 | Choi | H04L 9/3239 | 713/176 |
| 2004/0148500 A1* | 7/2004 | Olkin | H04L 51/30 | 713/150 |
| 2004/0151323 A1* | 8/2004 | Olkin | G06Q 20/401 | 380/280 |
| 2004/0177260 A1* | 9/2004 | Gilfix | G06F 21/52 | 713/193 |
| 2004/0243807 A1* | 12/2004 | Hughes | G06F 21/64 | 713/176 |
| 2004/0259633 A1* | 12/2004 | Gentles | G07F 17/32 | 463/29 |
| 2004/0259640 A1* | 12/2004 | Gentles | G06F 21/128 | 463/42 |
| 2004/0266523 A1* | 12/2004 | Gentles | G07F 17/323 | 463/29 |
| 2004/0266533 A1* | 12/2004 | Gentles | G06F 21/32 | 463/42 |
| 2005/0021962 A1* | 1/2005 | Benedikt | G06F 21/10 | 713/171 |
| 2005/0071273 A1* | 3/2005 | Vroman | G06Q 30/06 | 705/51 |
| 2006/0015720 A1* | 1/2006 | Go | H04L 9/083 | 713/165 |
| 2006/0101443 A1 | 5/2006 | Nasr | | |
| 2006/0161791 A1* | 7/2006 | Bennett | G06F 12/1408 | 713/193 |
| 2006/0259973 A1* | 11/2006 | Sima | G06F 21/577 | 726/25 |
| 2006/0282897 A1* | 12/2006 | Sima | G06F 11/3664 | 726/25 |
| 2007/0011667 A1* | 1/2007 | Subbiah | G06F 9/52 | 717/148 |
| 2007/0027934 A1* | 2/2007 | Roehrle | G06F 8/20 | |
| 2007/0288904 A1* | 12/2007 | Newcomb | G06F 21/57 | 717/126 |
| 2008/0046680 A1* | 2/2008 | Nagata | G06F 21/51 | 711/207 |
| 2008/0163383 A1* | 7/2008 | Kumar | G06F 21/575 | 726/29 |
| 2008/0209556 A1* | 8/2008 | Fu | G06F 9/44589 | 726/22 |
| 2009/0064114 A1* | 3/2009 | Bottomley | G06F 9/45504 | 717/148 |
| 2009/0132804 A1* | 5/2009 | Paul | G06F 9/5077 | 713/150 |
| 2009/0210874 A1* | 8/2009 | Harris | G06F 9/4552 | 718/1 |
| 2009/0307666 A1* | 12/2009 | Kilian | G06F 11/3604 | 717/125 |
| 2010/0005028 A1* | 1/2010 | Hartley | G06Q 30/0603 | 705/50 |
| 2010/0011446 A1* | 1/2010 | Klucher | G06F 21/10 | 726/27 |
| 2010/0107160 A1* | 4/2010 | Srinivasan | G06F 21/57 | 718/1 |
| 2010/0205164 A1* | 8/2010 | Schofield | G06F 16/1774 | 707/704 |
| 2010/0262830 A1* | 10/2010 | Kusakawa | G06F 21/77 | 713/172 |
| 2011/0010712 A1* | 1/2011 | Thober | G06F 9/45537 | 718/1 |
| 2011/0099362 A1* | 4/2011 | Haga | H04L 9/0822 | 713/2 |
| 2011/0173643 A1* | 7/2011 | Nicolson | G06F 21/575 | 719/328 |
| 2011/0179412 A1* | 7/2011 | Nakae | G06F 21/53 | 718/1 |
| 2012/0084567 A1* | 4/2012 | Hwang | H04L 9/3255 | 713/176 |
| 2012/0110578 A1* | 5/2012 | Yang | G06F 9/455 | 718/1 |
| 2012/0216045 A1* | 8/2012 | Seguin | G06F 21/51 | 713/182 |

(56) References Cited

U.S. PATENT DOCUMENTS

| | | | |
|---|---|---|---|
| 2012/0216052 A1* | 8/2012 | Dunn | G06F 21/78 713/193 |
| 2012/0246478 A1* | 9/2012 | Nakae | G06F 21/53 713/168 |
| 2012/0250858 A1* | 10/2012 | Iqbal | G06F 9/4856 380/44 |
| 2012/0290870 A1* | 11/2012 | Shah | G06F 21/10 714/4.11 |
| 2012/0324446 A1* | 12/2012 | Fries | G06F 21/64 718/1 |
| 2013/0007465 A1* | 1/2013 | Movassaghi | H04L 63/105 713/186 |
| 2013/0007889 A1* | 1/2013 | McCloy | G06F 8/61 726/26 |
| 2013/0065667 A1* | 3/2013 | Nelson | G07F 17/3223 463/25 |
| 2013/0215446 A1* | 8/2013 | Imai | H04N 1/4426 358/1.13 |
| 2014/0053274 A1* | 2/2014 | Stella | H04L 63/0428 726/25 |
| 2014/0096135 A1* | 4/2014 | Kundu | G06F 9/455 718/1 |
| 2014/0101264 A1* | 4/2014 | Dewaele | H04L 51/00 709/206 |
| 2014/0230068 A1* | 8/2014 | Kundapur | G06F 21/125 726/26 |
| 2015/0013015 A1* | 1/2015 | Zheng | G06F 21/105 726/27 |
| 2015/0019852 A1* | 1/2015 | Lin | G06F 21/575 713/2 |
| 2015/0039891 A1* | 2/2015 | Ignatchenko | G06F 9/45558 713/171 |
| 2015/0046350 A1* | 2/2015 | Bazigos | G06Q 30/018 705/317 |
| 2015/0106904 A1* | 4/2015 | Yamashita | H04L 63/0884 726/8 |
| 2015/0163248 A1* | 6/2015 | Epstein | G06F 21/604 726/1 |
| 2015/0199515 A1* | 7/2015 | Qureshi | G06F 21/56 726/22 |
| 2015/0235015 A1* | 8/2015 | Holler | G06F 8/65 726/27 |
| 2015/0254451 A1* | 9/2015 | Doane | G06F 21/44 726/1 |
| 2015/0271679 A1* | 9/2015 | Park | H04W 12/10 713/187 |
| 2015/0286821 A1* | 10/2015 | Ghose | G06F 9/3877 713/187 |
| 2015/0310427 A1* | 10/2015 | Yi | G06Q 20/385 705/64 |
| 2015/0347170 A1* | 12/2015 | Mohammed | G06F 8/65 718/1 |
| 2015/0347194 A1* | 12/2015 | Che | G06F 9/5077 718/1 |
| 2015/0358334 A1* | 12/2015 | Lantz | G06F 8/65 726/3 |
| 2015/0363192 A1 | 12/2015 | Sturtevant | |
| 2016/0050272 A1* | 2/2016 | Raduchel | H04L 67/1095 709/204 |
| 2016/0099917 A1* | 4/2016 | Glazemakers | H04L 69/30 726/12 |
| 2016/0117501 A1* | 4/2016 | Ghose | G06F 9/3851 713/190 |
| 2016/0170743 A1 | 6/2016 | Shmulevich et al. | |
| 2016/0170788 A1* | 6/2016 | Tarasuk-Levin | G06F 9/45558 718/1 |
| 2016/0253651 A1* | 9/2016 | Park | G07F 9/023 705/39 |
| 2016/0253670 A1* | 9/2016 | Kim | G06Q 20/4012 705/72 |
| 2016/0294559 A1* | 10/2016 | Dabak | H04L 9/3247 |
| 2016/0294887 A1* | 10/2016 | George | H04L 65/403 |
| 2016/0294888 A1* | 10/2016 | George | H04L 65/4038 |
| 2016/0294889 A1* | 10/2016 | George | H04L 65/403 |
| 2016/0299851 A1* | 10/2016 | Mattson, Jr. | G06F 21/78 |
| 2016/0300080 A1* | 10/2016 | Shah | H04L 9/0822 |
| 2017/0063810 A1* | 3/2017 | Bruce | H04L 63/045 |
| 2017/0098092 A1* | 4/2017 | Nachenberg | G06F 21/62 |
| 2017/0116424 A1* | 4/2017 | Aamir | H04W 12/0027 |
| 2017/0169213 A1* | 6/2017 | Zhao | G06F 12/1408 |
| 2017/0177395 A1* | 6/2017 | Sun | G06F 9/45558 |
| 2017/0177860 A1* | 6/2017 | Suarez | G06F 21/31 |
| 2017/0177877 A1* | 6/2017 | Suarez | G06F 16/2455 |
| 2017/0180346 A1* | 6/2017 | Suarez | G06F 9/45558 |
| 2017/0185771 A1* | 6/2017 | Sun | G06F 21/57 |
| 2017/0187540 A1* | 6/2017 | Stopel | H04L 9/3268 |
| 2017/0187694 A1* | 6/2017 | Friedman | G06F 9/45558 |
| 2017/0208055 A1* | 7/2017 | Golwalkar | H04L 63/08 |
| 2017/0293570 A1* | 10/2017 | Wang | G06F 12/0891 |
| 2017/0322868 A1* | 11/2017 | Hotra | G06F 11/3652 |
| 2017/0322869 A1* | 11/2017 | Hotra | G06F 11/3664 |
| 2017/0322870 A1* | 11/2017 | Hotra | G06F 11/3664 |
| 2017/0322934 A1* | 11/2017 | Chen | G06F 8/71 |
| 2017/0353318 A1* | 12/2017 | Hamburg | G06F 21/44 |
| 2017/0353444 A1* | 12/2017 | Karangutkar | H04L 63/0815 |
| 2017/0357496 A1* | 12/2017 | Smith | G06F 8/65 |
| 2017/0372073 A1* | 12/2017 | Gunti | H04L 9/3247 |
| 2017/0372074 A1* | 12/2017 | Gunti | H04L 9/3247 |
| 2018/0032383 A1* | 2/2018 | Surcouf | G06F 9/546 |
| 2018/0032734 A1* | 2/2018 | Gunti | G06F 21/575 |
| 2018/0068118 A1* | 3/2018 | Vandergeest | G06F 21/55 |
| 2018/0095955 A1* | 4/2018 | Kuang | G06F 16/17 |
| 2018/0144125 A1* | 5/2018 | Frank | G06F 11/3006 |
| 2018/0176244 A1* | 6/2018 | Gervais | G06F 21/552 |
| 2018/0181655 A1* | 6/2018 | Mateev | G06F 9/45533 |
| 2018/0232517 A1* | 8/2018 | Roth | H04L 67/10 |
| 2018/0351941 A1* | 12/2018 | Chhabra | H04L 63/08 |
| 2018/0357086 A1* | 12/2018 | Kinsella | H04L 49/70 |
| 2018/0357183 A1* | 12/2018 | Kumar | H04L 9/088 |
| 2018/0373885 A1* | 12/2018 | Arad | G06F 21/6254 |
| 2019/0227882 A1* | 7/2019 | Shelke | G06F 11/1469 |
| 2019/0253523 A1* | 8/2019 | Raduchel | H04W 4/21 |

OTHER PUBLICATIONS

Kenneth Owens, "Programmable Microservices Infrastructure with Mantl Release 1", Cisco Blogs (http://blogs.cisco.com), Feb. 16, 2016, 11 pages.

Dmitry Savchenko and Gleb Radchenko, "Microservices Validation: Methodology and Implementation", South Ural State University, Chelyabinsk, Russia (gleb.radchenko@susu.ru), 8 pages.

* cited by examiner

CONTINUED VERIFICATION AND MONITORING OF APPLICATION CODE IN CONTAINERIZED EXECUTION ENVIRONMENT

TECHNICAL FIELD

The present disclosure generally relates to software product release and monitor, and more specifically relates to verification and monitor of application code released in a containerized execution environment.

BACKGROUND

The process of software release (e.g., by an organization) typically includes the steps of compiling the source code into executable code, bundling the source code, executable code, and associated metadata into an archive of files, proscribing a set of rules for accepting and upgrading the released software, and enforcing these rules on the end users of the released software.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
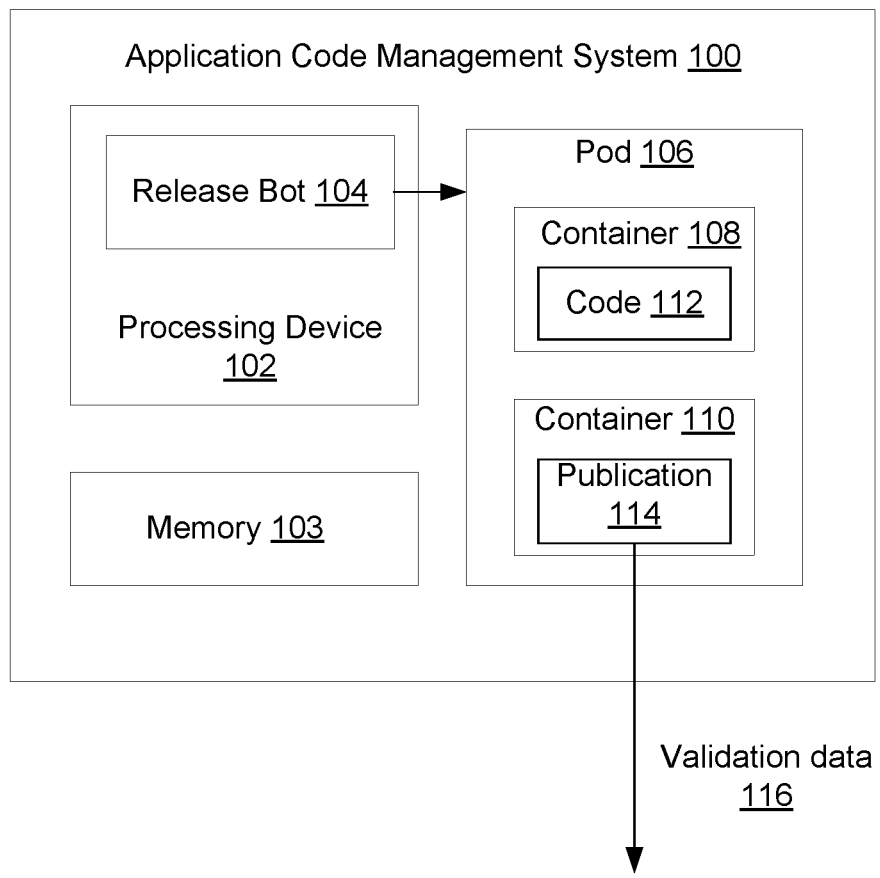
FIG. 1 illustrates an application code management system according to an implementation of the present disclosure.

In a containerized software development environment, a software application can be developed by multiple entities (e.g., different developers). A container is an execution environment represented by an isolated virtualized user-space instance of an operating system, such that the user-space instance is associated with a kernel instance which may be shared with other containers. The containers may be employed to store the software application code and microservices (e.g., a utility program such as a compiler) for performing operations on the software code. A microservice is an independently-deployable modular service that communicates with other services through a lightweight interface. The code of the software application may be stored along with microservices in containers to create containerized applications.

The containerized application may be released as software product that can be executed as a self-contained application on nodes in a cloud. A node (that can be a host computer or a virtual machine) may support a container execution environment (e.g., Docker environment). Although containers may facilitate agile releases of software application code developed by different entities, code releases may be slowed down by the need for continuous human interventions (e.g., proscribing the rules and enforcing these rules). Further, microservices created by the developers may perform inappropriate actions that may adversely affect the integrity of a container. Such inappropriate actions may include mounting source code into the container at runtime, binding to restricted ports, starting multiple daemon processes (which is not recommended for container execution environments), using insecure building tools, or obtaining source code from unsecured sources (e.g., the Internet).

Implementations of the present disclosure provide enterprises with a release bot for performing actions associated with releasing code in the form of containerized applications. The release bot can be a software application running in the enterprise network. The actions performed by the release bot may include creating a union container object (referred to as a pod). The pod may contain a collection of containers that share a storage and contexts about how to run the containers within the pod. The pod created by the release bot may include a first container to store source code and a second container containing a publication microservice for providing validation information about the source code to a validation service. The microservice in the second container may have been provided by the enterprise and certified to be reliable. The publication microservice, when executed in a containerized execution environment, may generate validation data based on certain attributes of the source code that is stored in the pod. The publication microservice may then transmit the validation data to the validation service running either within the enterprise network or as a third-party independent service. The validation service may determine a validation status (either valid or invalid) of the software code in the pod in view of the validation data and notify the enterprise of the validation status.

Conventional approaches to releasing code of software application through containers involve manual customization by the releasing entity. Further, the code released by the conventional approach is vulnerable to attacks by malicious microservices contributed by developers. Implementation of the present disclosure provides a technical solution that improves the computer technology of releasing and executing computer code in a cloud computing environment. Implementations provide the release bot that may incorporate an enterprise-certified microservice in the containerized application and provide a validation service for the enterprise. The enterprise-certified microservice may transmit validation data to the validation service during execution of the code, and the validation service may detect anomaly in the code based on the validation data.

FIG. 1 illustrates an application code management system 100 according to an implementation of the present disclosure. The application code management system 100 can be a computer system (e.g., a server acting as a code depot) implementing an certain application programming interface (e.g., Kubernetes API) to facilitate deployment, scaling, and management of containerized software applications.

Application code management system 100 may include a processing device 102 such as, for example, a central processing unit (CPU) that may execute the program code of software applications. Application code management system 100 may also include storage devices such as, for example, a memory 103 and/or hard disks that may store the program code of these containerized software applications. In one implementation, Application code management system 100 may, via a network (e.g., a HTTP network), connect to nodes in a cloud computing environment, whereas a node can be a physical machine or a virtual machine that provides a containerized application execution environment (e.g., the Docker environment) for executing the containerized application. Software developers may submit application code to the application code management system 100. The software application code is stored as a component along with microservices (e.g., utility applications) associated with the code in a container and is to be released as part of a containerized application that can be executed in a container execution environment (e.g., Docker system)

In one implementation, processing device 102 may run a release bot 104 to release the software application in a secure manner. Release bot 104 can be a dedicated program running on processing device 102. For example, release bot 104 can run as a daemon in the background. Responsive to receiving a request (e.g., via a user interface or via an API call) to release a software application, processing device 102 may execute release bot 104 to create a pod 106 which may contain a collection of containers. The containers in pod 106 may share storage and contexts about how to run the containers within the pod. The created pod 106 may be assigned a unique identifier (UID). The shared context in the pod may include a set of namespaces, control groups, and other attributes associated with the containers in the pod for achieving container isolation (e.g., as isolated instances in the shared kernel). Containers associated with pod 106 may share an Internet protocol (IP) address and port space, and may communicate with each other using inter-process communications (e.g., semaphores and/or shared memory). The storage shared by containers in pod 106 is referred to as shared volumes which are defined as part of the pod and are made available to be mounted into each application's file system.

In one implementation, pod 106 may be specified using a pod configuration file that includes fields to store attribute values of pod 106. The attributes stored in pod 106 may include the unique identifier associated with pod 106, an optional label (e.g., an arbitrary key value) that can be used for grouping pods having the same key value, and a specification field to store container attributes for containers in pod 106. For each container in pod 106, the specification field may include sub-fields to specify a container name attribute which is unique within pod 106, a default image entry point attribute (if not otherwise provided) and image pull policy attribute (e.g., Always, Never etc.), and an optional command attribute to specify a start-up command for the image. The attributes stored in pod 106 may further include an environment attribute including pairs of an environment variable and its corresponding value, a list of port attributes that are exposed by the container, and a volume attribute to specify the storage devices (i.e., volumes) that can be mounted by the container. Each port attribute may include a port number, a port name that can be referred to by microservices, a protocol associated with the port, a resource attribute to specify the computer resources (e.g., CPU, memory) used by the container. The volume attribute may specify a temporary directory that is shared by containers during the pod lifetime.

The specification field can also be used to specify a microservice in a container. The specification field may include a selector attribute to specify the microservice that may generate validation data associated with the code stored in the container and post the validation data to an exposed port. The specification field may also include a port attribute to specify an exposed port number, a protocol used by the port (e.g., TCP), and a target port to specify the port name associated with a validation service that can receive the data from the exposed port.

As shown in FIG. 1, release bot 104 may create pod 106 that may include a first container 108 and a second container 110. Container 108 may be an application source container that stores the source code 112 to be released as a containerized application. In one implementation, container 108 may contain an archive (e.g., a tarball) of source code 112. In another implementation, container 108 may store links (e.g., a reference pointer) to source code 112 that is stored in file directories in the storage (referred to as a volume) associated with pod 106. Container 108 may also include a suit of microservices that can be employed to perform operations on source code 112. The microservices in the suit may be independently deployable. Examples of microservices associated with source code 112 may include compiler microservices (e.g., gcc), software building microservices (e.g., maven, gradle), and code execution microservices (e.g., sbt run). Thus, code 112 along with these microservices may be packaged in container 108 to form an application that may run in a container execution environment (e.g., the Docker environment).

The created pod 106 may also include a second container 110 for running a publication microservice 114 that computes and publishes verification data associated with code 112 in the first container 108. In one implementation, container 110 may define microservice 114 (referred to as publication microservice) in the selector attribute field. In one implementation, publication microservice 114 is an enterprise-certified microservice that, by virtue of executing in a separate container, is isolated from microservices in container 108. The second container is not accessible to developers that contribute to the code. For example, the second container is assigned with an access right that excludes contributions from entities other than the enterprise. Thus, container 110 and publication microservice 114 cannot be tampered with by a developer that submits code 112 to application code management system 100.

Publication microservice 114 may generate validation data 116 and publish the validation data to a target port according to a transmission protocol (e.g., TCP). The target port may specify the validation server that receives the validation data. In one implementation, publication microservice 114 may calculate a first hash value of the code 112 and generate a digital signature of first hash value using a private key of an encryption key pair. The key pair may include the private key and a corresponding public key for decryption. The encryption scheme can be a suitable encryption method such as, for example, the Pretty Good Privacy (PGP) encryption method. Publication microservice 114 may publish the digital signature as validation data 116 to a validation service (not shown) at the target port using the specified protocol. The validation service may use the public key to decrypt the digital signature and restore a first hash value associate with the code. Further, validation service may retrieve a second hash value that had been provided to the validation service as known hash of the code 112. Validation service may then compare the first hash value with the second hash value to determine whether the code is altered or tempered. In one implementation, the comparison may include comparing the checksum of the first hash value with the checksum of the second hash value. In another implementation, publication microservice 114 may take a snapshot of the directory storing code 112. The snapshot can be a file (e.g., an XML file, a tarball, or zip file) that contains information stored in the directory, including part of code 112 and metadata information associated with code 112. Publication microservice 114 may calculate a digital signature of the snapshot and publish the digital signature of the snapshot as validation data 116 to a validation service.

Figure 2:
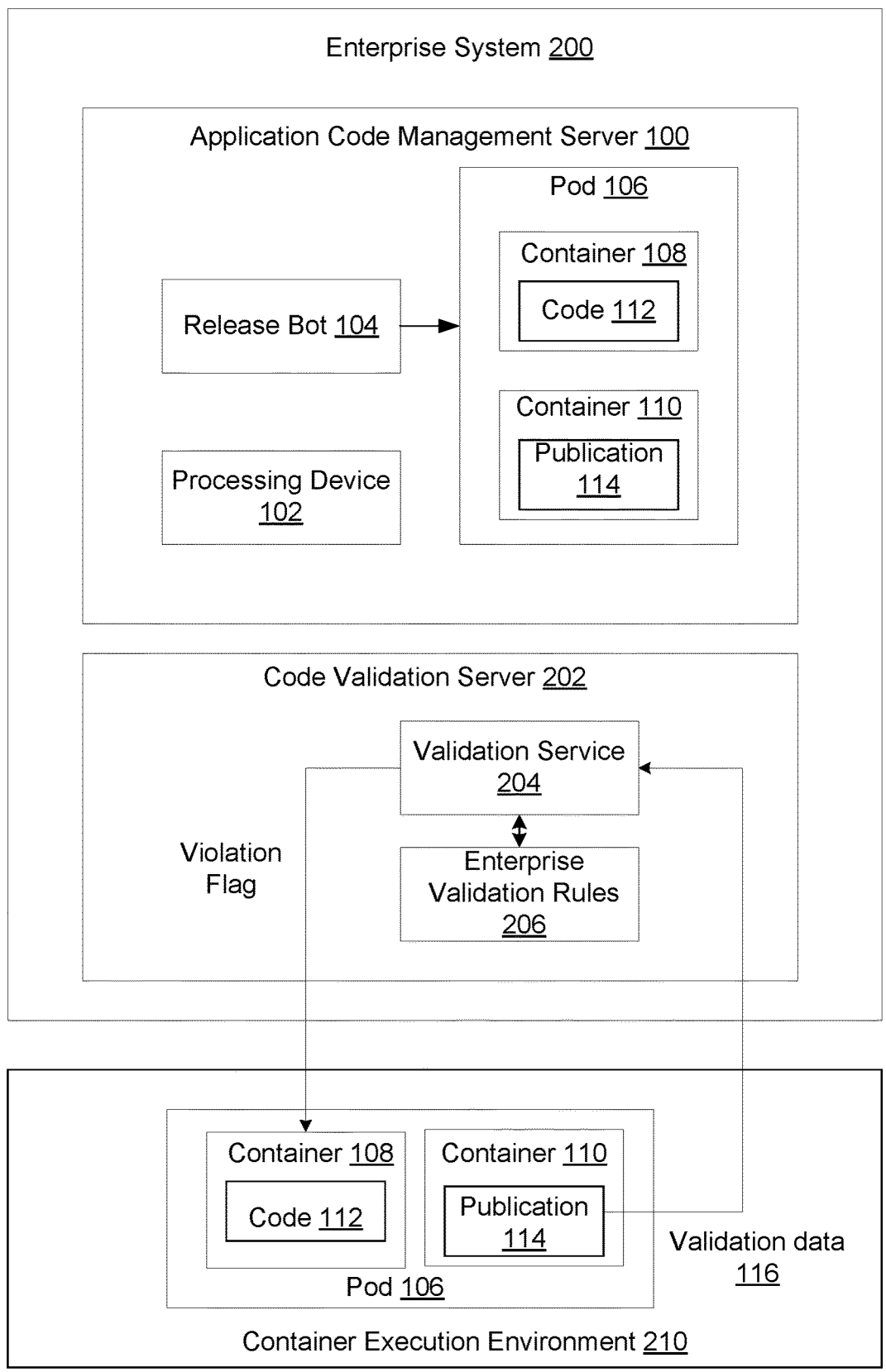
FIG. 2 illustrates an enterprise system that provides an application code management server and a code validation service according to an implementation of the present disclosure.

In one implementation, an enterprise system may provide the validation service to check the integrity of a containerized application released to the public. The integrity of the code can be checked in view of the validation data published the publication microservice associated with the code. FIG. 2 illustrates an enterprise system 200 that provides application code management server 100 and a code validation servicer server 202 according to an implementation of the present disclosure. Although code validation server 202, as shown in FIG. 2, is part of enterprise system 200, code validation server 202 can be an independent server dedicated for performing validation services for multiple enterprise systems. For example, code validation server 202 may be communicatively connected to enterprise 200 via a public network.

In one implementation, code validation server 202 may run on processing device 102 that may execute the validation service 204. Validation service 204 may receive validation data 116 published by publication microservice 114 associated with released code 112, where validation service 204 may have been specified as the target port for publication microservice 114. For example, as shown in FIG. 2, containerized application released in pod 106 may have been replicated by a replication controller associated with application code management server 100. Pod 106 may then be released to a node in container execution environment 210 (e.g., a Docker environment). The code 112 in container 108 may run on the node. The pod 106 in container execution environment 210, as discussed above, may include enterprise-certified publication microservice 114 that, when executed, may publish validation data 116 designated to validation service 204 according to a schedule (e.g., periodically or on demand at the request of the container execution environment 210).

Validation service 204 may check the integrity of code 112 in view of the received validation data 116. In one implementation, validation service 204 may perform the code integrity check according to pre-specified enterprise validation rules 206 stored in a database associated with code validation server. For example, validation rules 206 may include a first rule to prohibit the code from referencing non-licensed libraries, a second rule to prohibit importing any package from uncertified sources, and a third rule to require the code conforming with proper format and documentation. In one implementation, validation service 204 may acquire a public key from release bot 104 and receive validation data 116 including a digital signature of code 112, the digital signature being created using a private key matching to the public key in a key pair. In one implementation, the digital signature may contain a first cryptographic hash of the code generated using a set of hash function by the publication microservice. Validation service 204 may decrypt the digital signature to restore the first hash value using the public key. Further, validation service 204 may retrieve a second hash value that had been provided to the validation service 204 as known hash of the code. Validation service may then compare the first hash value with a second hash value to determine whether the code is altered or tempered. In another implementation, validation service 204 may have access to a copy of a snapshot of a directory storing code 112. Validation service 204 may then receive validation data 116 including a first digital signature of the snapshot from publication microservice 114. Responsive to receiving the validation data 116, validation service 204 may generate a second digital signature for the copy of snapshot that is accessible by validation service 204, and then compare the first digital signature with the second digital signature. If these two digital signatures are different, validation service 204 may determine that code 112 may have been altered or tempered with.

Responsive to determining that the integrity of code 112 may have been compromised, validation service 204 may issue instruction to destruct the container 108 that contains code 112. In another implementation, validation service may send a message to container execution environment 210 to warn about the violating code 112. Validation service 204 may inform application code management server 100 which may then determine the cause of the violation (e.g., malicious code was mounted from a volume into code 112).

Figure 3:
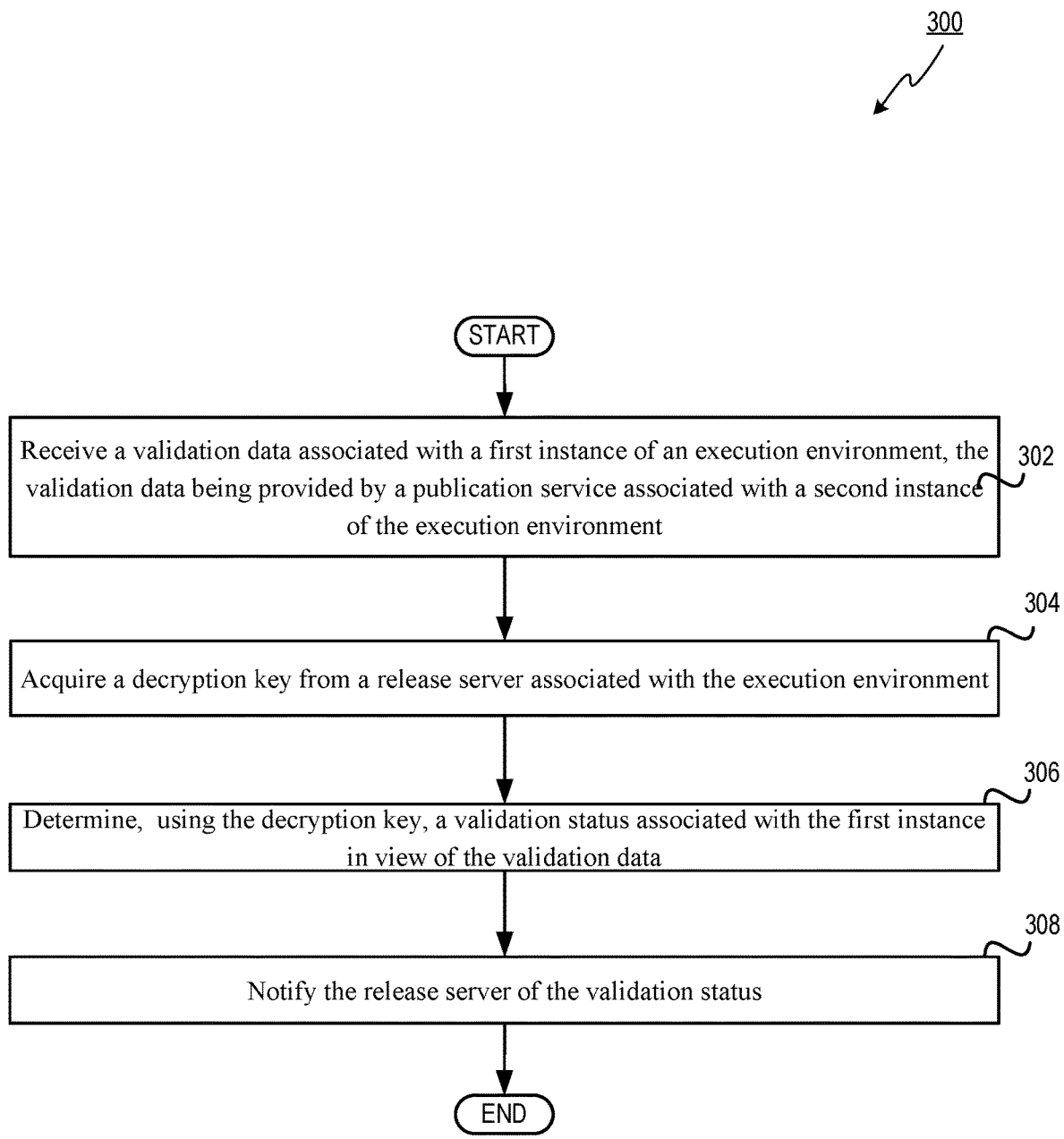
FIG. 3 depicts a flow diagram of a method for validating source code according to an implementation of the present disclosure.

FIG. 3 depicts a flow diagram of a method 300 for validating source code according to an implementation of the present disclosure. Method 300 may be performed by processing devices that may comprise hardware (e.g., circuitry, dedicated logic), computer readable instructions (e.g., run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by processing device executing a code validation service as shown in FIG. 2.

Referring to FIG. 3, method 300 may be performed by processing devices of a computing device and may begin at block 302. At block 302, a processing device may execute a validation service to receive a validation data associated with a first instance of an execution environment, the validation data being provided by a publication service associated with a second instance of the execution environment.

At block 304, the processing device may acquire a decryption key from a release server associated with the execution environment.

At block 306, the processing device may determine, using the decryption key, a validation status associated with the first instance in view of the validation data.

At block 308, the processing device may notify the release server of the validation status.

Figure 4:
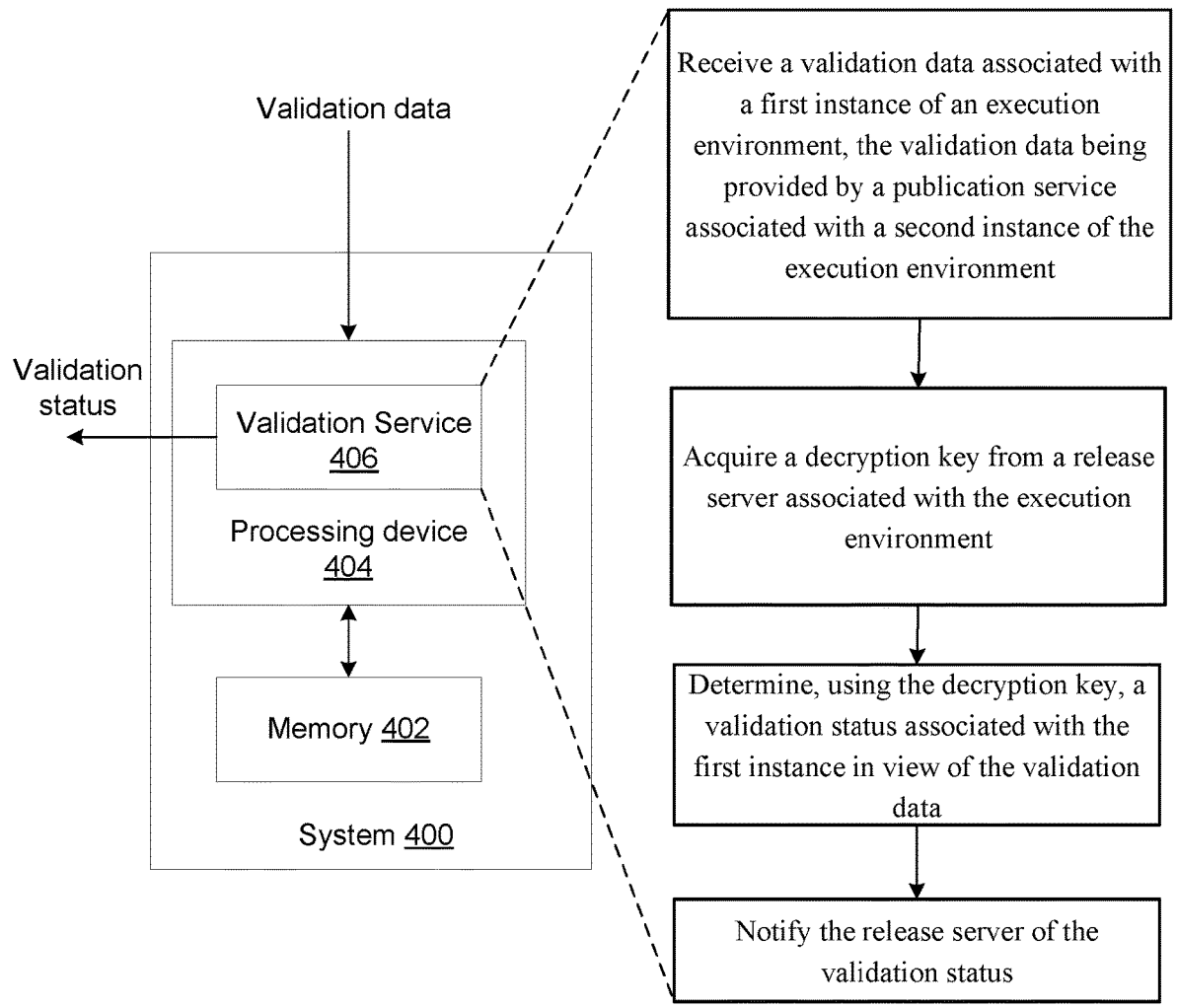
FIG. 4 is a system for validating code according to an implementation of the present disclosure.

FIG. 4 is a system 400 for validating code according to an implementation of the present disclosure. System 400 may include a memory 402 and a processing device 404 communicatively coupled to memory 402. The processing device 404 may execute a validation service 406 to receive a validation data associated with a first instance of an execution environment, the validation data being provided by a publication service contained in a second instance of the execution environment, acquire a decryption key from a release server that releases the first instance and the second instance of the execution environment, determine a validation status associated with the first instance in view of the validation data using the decryption key, and notify the release server of the validation status.

Figure 5:
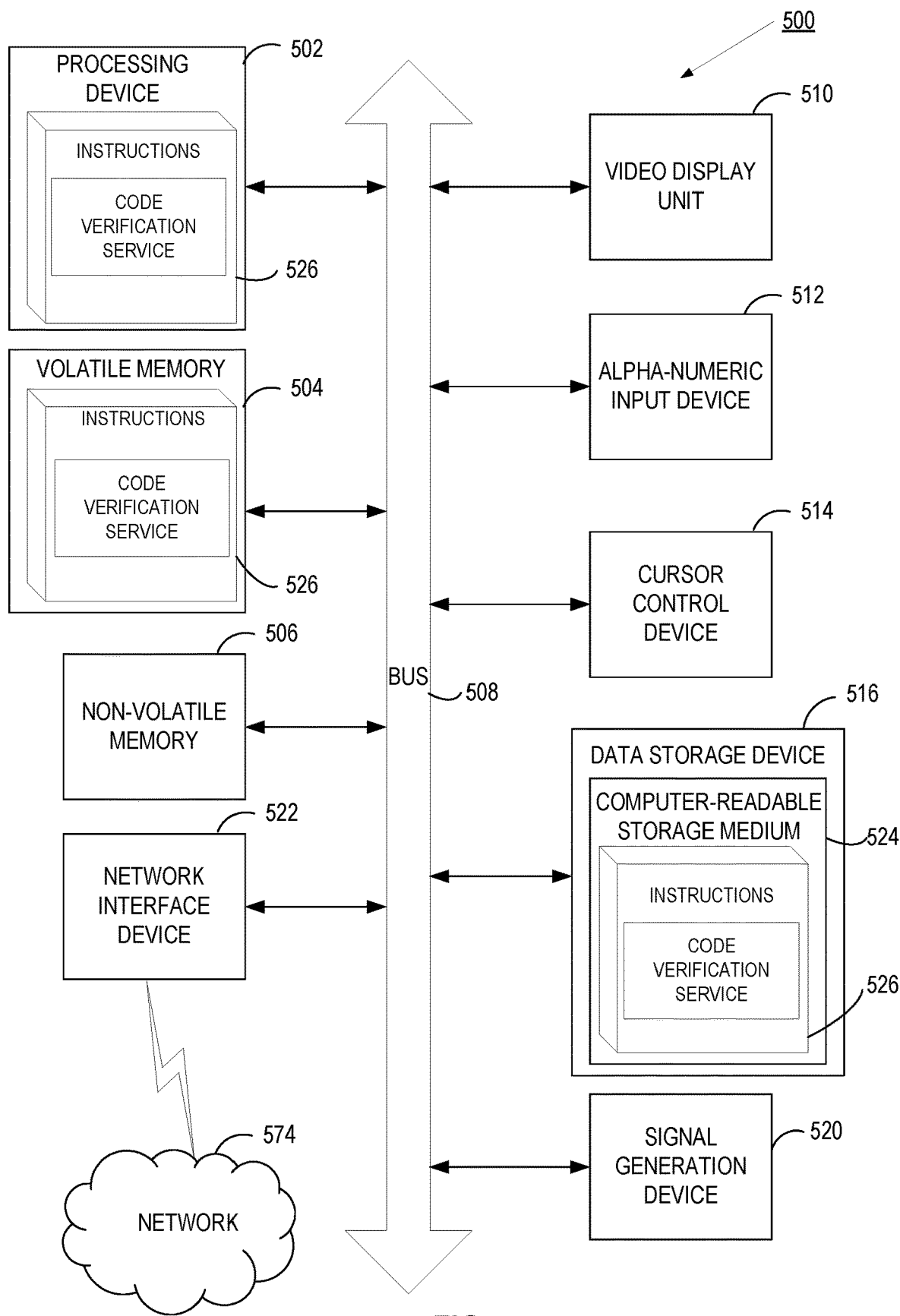
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 400 may correspond to a computing device within system architecture 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding output volume control of FIG. 1 for implementing method 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a processing device executing a validation service provided by an enterprise system that manages integrity of release of code, a validation data associated with code being executed at a first instance of an execution environment, the validation data provided by a publication service associated with a second instance of the execution environment, wherein the publication service is certified by the enterprise system and wherein the first instance and the second instance are virtualized user-space instances isolated from each other;
acquiring a decryption key from a release server associated with the execution environment;
determining, using the decryption key, a validation status associated with the first instance in view of the validation data; and
notifying the release server of the validation status.

2. The method of claim 1, wherein the execution environment is containerized, and wherein the first instance is a first container and the second instance is a second container, and wherein the first container and the second container are associated with a union container object.

3. The method of claim 2, wherein the validation data comprises a digital signature associated with a first hash value of a code in the first container, and wherein determining the validation status comprises:
decrypting the digital signature using the decryption key to generate the first hash value; and
comparing the first hash value with a second hash value provided to the validation service to determine the validation status.

4. The method of claim 2, wherein the validation data comprises a first digital signature of a snapshot of a file folder referenced by a link in the first container, and wherein the file folder contains code stored in a storage device.

5. The method of claim 4, wherein determining the validation status comprises: receiving the validation data comprising the first digital signature;
calculating a second digital signature in view of a copy of the snapshot of a directory accessible by the validation service; and
determining the validation status in view of a difference between the first signature and the second signature.

6. The method of claim 1, wherein the validation status comprises an invalid status, and wherein the method further comprises: responsive to receiving the invalid status, issuing an instruction for the execution environment to destruct the first instance.

7. The method of claim 1, further comprising:
providing a release bot to generate the first instance and the second instance and to release the first instance and the second instance in a union container object as a software production.

8. The method of claim 2, wherein the publication service is a microservice insulated from the first container.

9. A system comprising:
a memory; and
a processing device, communicatively coupled to the memory, and executing a validation service provided by an enterprise system that manages integrity of release of code, to:
receive a validation data associated with code being executed at a first instance of an execution environment, the validation data provided by a publication service associated with a second instance of the execution environment, wherein the publication service is certified by the enterprise system and wherein the first instance and the second instance are virtualized user-space instances isolated from each other;
acquire a decryption key from a release server associated with the execution environment;
determine, using the decryption key, a validation status associated with the first instance in view of the validation data; and
notify the release server of the validation status.

10. The system of claim 9, wherein the execution environment is containerized, and wherein the first instance is a first container and the second instance is a second container, and wherein the first container and the second container are associated with a union container object.

11. The system of claim 10, wherein the validation data comprises a digital signature associated with a first hash value of a code in the first container, and wherein to determine the validation status, the processing device is to:
decrypt the digital signature using the decryption key to generate the first hash value; and comparing the first hash value with a second hash value provided to the validation service to determine the validation status.

12. The system of claim 11, wherein the validation data comprises a first signature of a snapshot of a file folder referenced by a link in the first container, and wherein the file folder contains code stored in a storage device.

13. The system of claim 12, wherein to determine the validation status, the processing device is to:
receive the validation data comprising the first signature;
calculate a second signature in view of a copy of the snapshot of the directory accessible by the validation service; and
determine the validation status in view of a difference between the first signature and the second signature.

14. The system of claim 10, wherein the validation status comprises an invalid status, and wherein responsive to receiving the invalid status, the processing device is to issue an instruction for the execution environment to destruct the first instance.

15. The system of claim 10, wherein the processing device is further to provide a release bot to generate the first instance and the second instance and to release the first instance and the second instance in a union container object as a software production.

16. The system of claim 10, wherein the publication service is a microservice insulated from the first container.

17. A computer-readable non-transitory medium with codes stored thereon that, when executed by a processing device, cause the processing device to:
receive, by the processing device executing a validation service provided by an enterprise system that manages integrity of release of code, a validation data associated with code being executed at a first instance of an execution environment, the validation data provided by a publication service associated with a second instance of the execution environment, wherein the publication service is certified by the enterprise system and wherein the first instance and the second instance are virtualized user-space instances isolated from each other;
acquire a decryption key from a release server associated with the execution environment;
determine, using the decryption key, a validation status associated with the first instance in view of the validation data; and
notify the release server of the validation status.

18. The computer-readable non-transitory medium of claim 17, wherein the execution environment is containerized, and wherein the first instance is a first container and the second instance is a second container, and wherein the first container and the second container are associated with a union container object.

19. The computer-readable non-transitory medium of claim 18, wherein the validation data comprises a digital signature associated with a first hash value of a code in the first container, and wherein to determine the validation status, the processing device is further to:
  decrypt the digital signature using the decryption key to generate the first hash value; and compare the first hash value with a second hash value provided to the validation service to determine the validation status.

20. The computer-readable non-transitory medium of claim 17, wherein the validation status comprises an invalid status, and wherein responsive to receiving the invalid status, the processing device is to issue an instruction for the execution environment to destruct the first instance.

\* \* \* \* \*